United States Patent

Yonezawa et al.

[11] Patent Number: 5,889,276
[45] Date of Patent: Mar. 30, 1999

[54] FOCUS-DETECTING METHOD AND DEVICE HAVING A LIGHT BLOCKING MEMBER PLACED SUBSTANTIALLY AT THE CONJUGATE IMAGE POINT OF THE PUPIL OF THE OBJECT LENS

[75] Inventors: Yasuo Yonezawa, Zushi; Osamu Yamashita, Musasino; Tsuneo Hasegawa, Saitama-ken, all of Japan

[73] Assignee: Nikon Corporation, Tokyo, Japan

[21] Appl. No.: 881,018

[22] Filed: Jun. 23, 1997

[30] Foreign Application Priority Data

Jun. 25, 1996 [JP] Japan .................................. 8-185655

[51] Int. Cl.$^6$ .................................................. G01N 21/86
[52] U.S. Cl. ................................ 250/201.3; 250/201.4; 356/376
[58] Field of Search .............................. 250/201.3, 201.4, 250/204, 216; 356/376

[56] References Cited

U.S. PATENT DOCUMENTS

| | | |
|---|---|---|
| 3,721,817 | 3/1973 | Reinheimer . |
| 4,620,089 | 10/1986 | Schlichting et al. ................ 250/201.4 |
| 4,798,948 | 1/1989 | Neumann et al. .................. 250/201.3 |
| 5,317,142 | 5/1994 | Noda et al. ........................ 250/201.7 |
| 5,483,079 | 1/1996 | Yonezawa ......................... 250/201.4 |
| 5,530,237 | 6/1996 | Sato et al. ......................... 250/201.4 |

FOREIGN PATENT DOCUMENTS

06003578 A   1/1994   Japan .

*Primary Examiner*—Stephone B. Allen
*Attorney, Agent, or Firm*—Michael N. Meller

[57] ABSTRACT

A focus-detecting method and device is provided for detecting when an object is arranged in a focal plane of an object lens. A pattern or a light-source image is formed based on a light-beam on the object through an object blends. The light-beam emitted from the light-beam pattern on the object is reflected from the object to the object lens. Plural images of the light-beam pattern are formed along an optical axis of the object lens based on the light-beam passed through the object lens. A conjugate image point of the pupil of the object lens is formed between the object lens and a final imaging plane based on the light-beam passed through the object lens. The final light-beam pattern is imaged toward the final imaging plane. A photodetecting device is arranged on the final imaging plane. A shielding plate is provided to partially block the light beam from reaching the photodetecting device. The shielding plate is placed substantially at the conjugate image point of the pupil of the object lens.

14 Claims, 10 Drawing Sheets

FOCUS-DETECTING METHOD AND DEVICE HAVING A LIGHT BLOCKING MEMBER PLACED SUBSTANTIALLY AT THE CONJUGATE IMAGE POINT OF THE PUPIL OF THE OBJECT LENS

BACKGROUND OF THE INVENTION

The present invention relates to a focus-detecting method and device. More particularly, the present invention relates to a focus-detecting method and device used in a microscope having reflected illumination.

A conventional focus-detecting device used in a microscope with reflected illumination normally employs a detecting method in which a slit pattern is projected onto an object and a reflected image therefrom is detected by a photoelectric detecting device. Such a conventional arrangement is shown, for example, in U.S. Pat. No. 3,721,827, which is described hereinafter referring to FIGS. 9 and 10.

FIG. 9 shows an example with a focal objective lens. Illumination light from a light source 1 passes through a condenser 2 and illuminates a slit 3. One-half of the beam emitted from the slit 3 is blocked by an illumination-side shielding plate 4 which blocks the beam from 0 degrees to 180 degrees around the optical axis. The other half of the light is reflected by a half mirror 6 and passes through an objective lens 7 to reach an object 8. The light reflected from the object 8 passes back through the objective lens 7 and is transmitted through the half mirror 6 to reach a photodetecting device 14.

FIG. 10 shows a prior art example with an afocal objective lens. Illumination light from the light source 1 illuminates the slit 3 through the condenser 2. One-half of the beam emitted from the slit 3 is blocked by the illumination-side shielding plate 4. The other half of the light beam passes through a collimating lens 5 to form a parallel beam, is reflected by the half mirror 6, and passes through the objective lens 7' to reach the object 8. The light reflected from the object 8 passes back through the objective lens 7', is transmitted through the half mirror 6, and passes through a second objective lens 9 to reach the photodetecting device 14.

Both conventional examples shown in FIGS. 9 and 10 detect a focusing state by sensing the deviation of the center of gravity of the slit image formed on the photodetecting device 14. Not illustrated in FIGS. 9 and 10 are the eyepiece arrangement for viewing the object and the servomotor arrangement for automatically moving the object into the focal plane of the objective lens as a result of the image formed on the photodetecting device. These are conventional as shown in the aforementioned patent and are not illustrated in order to avoid unnecessarily complicating the drawings.

However, the above-mentioned conventional technology has the following problem. When deviations in light intensity and phase distribution of an object 8 are large, as seen in a wafer pattern, both diffracted light and scattered light from the object 8 reach the photodetecting device 14. This results in poor focal accuracy. Generally focal accuracy is excellent when the light intensity and phase distribution of an object 8 are small as seen in an object having a mirror surface. The light shown by the dotted lines in FIGS. 9 and 10 is diffracted light and scattered light.

To solve this problem, JP Kokai H6-3578 discloses a focus-detecting device in which a section for forming parallel rays is provided after forming an intermediate image between the objective lens and the photodetecting device. A detection-side shielding plate is formed asymmetrically around the optical axis and placed therein.

According to the technology disclosed in JP Kokai H6-3578, the diffracted light and scattered light which hinder focus detection are blocked. However, certain positioning of the detection-side shielding plate may block light which is necessary for focus detection. This makes it impossible to properly detect focusing.

SUMMARY OF THE INVENTION

Accordingly, it is an object of the present invention to overcome the above-noted problems of prior art solutions.

It is a further object of the present invention to provide a focus-detecting method and apparatus capable of blocking only the diffracted light and scattered light which tend to prevent accurate focus detection.

To solve the above problems, the present invention provides a focus-detecting method for detecting when an object is arranged in a focal plane of an object lens using a photodetection device arranged in a final imaging plane. The method includes the steps of forming a light-beam pattern formed based on a light-beam on the object through the object lens and directing the light-beam emitted from the light-beam pattern on the object through the object lens. Also included are the steps of forming a plurality of images of a light-beam pattern along an optical axis of the object lens based on the light-beam passed through the object lens and a conjugate image point of the pupil of the object lens between the object lens and the final imaging plane based on the light-beam passed through the object lens. The final light-beam pattern image is imaged toward the final imaging plane. The final step is the prevention, substantially at one of the conjugate image points, of a predetermined portion of the light-beam reflected from the object from reaching the final imaging plane.

A preferred embodiment of the present invention also includes the step of preventing substantially one-half of the light beam reflected from the object from reaching the final imaging plane.

Another embodiment of the present invention includes a focus-detecting apparatus for detecting when an object is arranged in a focal plane of an object lens using a photodetection device arranged in a final imaging plane. The apparatus includes a light source system for supplying a light-beam to the object and forming a light-beam pattern on the object through the object lens. An image optical system is included for collecting the light-beam emitted from the light-beam pattern on the object and reflected from the object through the object lens. A plurality of images of a light-beam pattern are formed along an optical axis and the final light-beam is imaged towards the final imaging plane, the imaging optical system forming a conjugate image point of the pupil of the object lens between the object lens and the final imaging plane. Finally, a light-blocking member is arranged substantially at a conjugate image point for preventing a predetermined portion of the light-beam pattern reflected from the object from reaching the final imaging plane.

In a further preferred embodiment of the apparatus incorporating the principles of the present invention, the object is arranged within a depth of focus, the light-blocking member is disposed between a first image plane corresponding to the upper limit of the depth of focus and a second image plane corresponding to the lower limit of the depth of focus.

In another embodiment, the light-blocking member is arranged asymmetrically around the optical axis.

BRIEF DESCRIPTION OF THE DRAWINGS

The above and other objects, features, and advantages of the present invention will become more apparent from the following detailed description taken with the accompanying drawings, in which:

FIG. 2, including

FIG. 4, including

FIG. 6, including

FIG. 8, including

DESCRIPTION OF THE PREFERRED EMBODIMENTS

Figure 1:
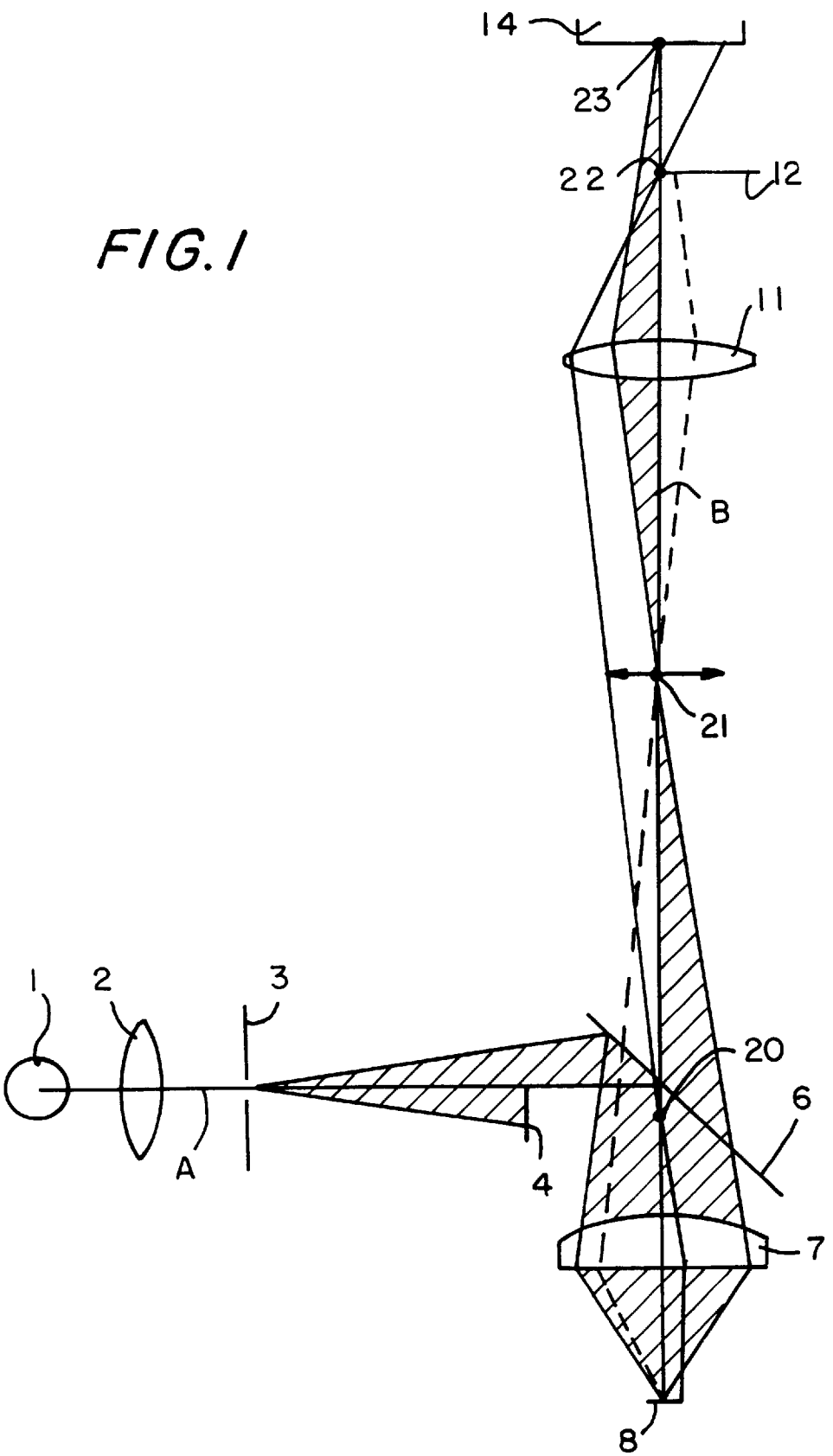
FIG. 1 is a schematic drawing showing the construction of a first embodiment of the present invention.

Referring to the drawings, FIG. 1 shows a first embodiment, wherein a first image 21 is formed through a focal objective lens 7, and then a second image 23 is formed on a photodetecting device 14 through a relay lens 11 which is a positive lens.

Illumination light from a light source 1 illuminates a slit 3 through a condenser 2. One-half of the light beam emitted from the slit 3 is blocked by an illumination-side shielding plate or blocking member 4 which blocks only the light at 0 degrees to 180 degrees around the optical axis A. The other half of the light is reflected by a half mirror 6 and passes through the objective lens 7 to reach an object 8. The light reflected from the object 8 passes back through the objective lens 7 and is transmitted through the half mirror 6 to form the first image 21. Further, the light passes through the relay lens 11 to form a second image 23 on the final image plane on the photodetecting device 14. Consequently, a conjugate image point 22 of the pupil 20 of the objective lens 7 is formed between the relay lens 11 and the photodetecting device 14. A detection-side shielding plate or blocking member 12 which blocks only the light at 0 degrees to 180 degrees around the optical axis B is positioned such that it coincides with the portion of light blocked by the illumination-side shielding plate 4. The light beam shown by the dotted line in FIG. 1 is, for example, diffracted light and scattered light from the object 8, which interferes with proper focus detection. As shown in the same figure, only the harmful light, represented by the dotted line, is efficiently blocked by the detection-side shielding plate 12.

As noted above the conventional eyepiece arrangement of the microscope and servomechanism for adjusting the object is not illustrated in order to avoid unnecessarily complicating the drawings.

Figure 2A:
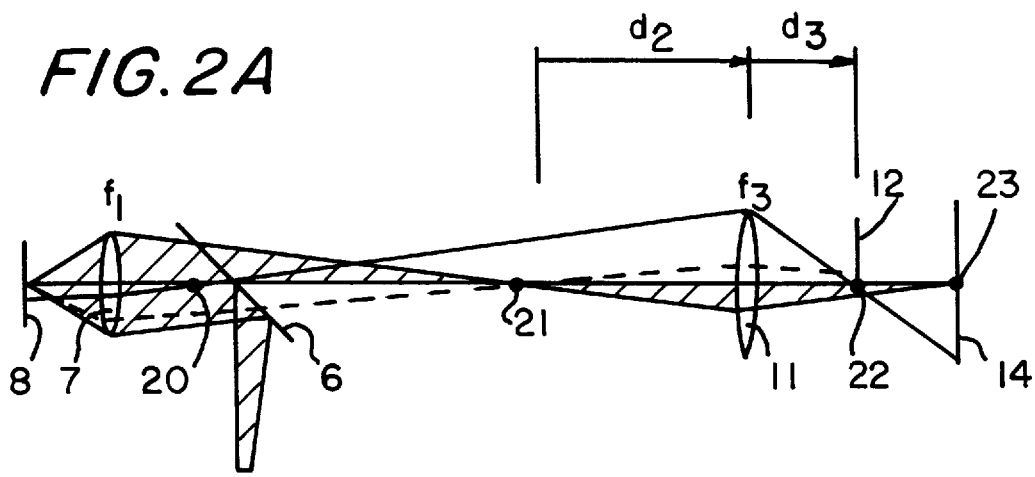
FIGS. 2(A) through 2(C), is a schematic drawing showing the optical path of the first embodiment.

The operation of this embodiment is described referring to FIG. 2. FIG. 2(A) shows a focused condition when the object 8 is placed in a focal plane of the illumination light transmitted through the objective lens 7. At that time, the photodetecting device 14 is at a conjugate point of a slit (not illustrated).

Figure 2B:
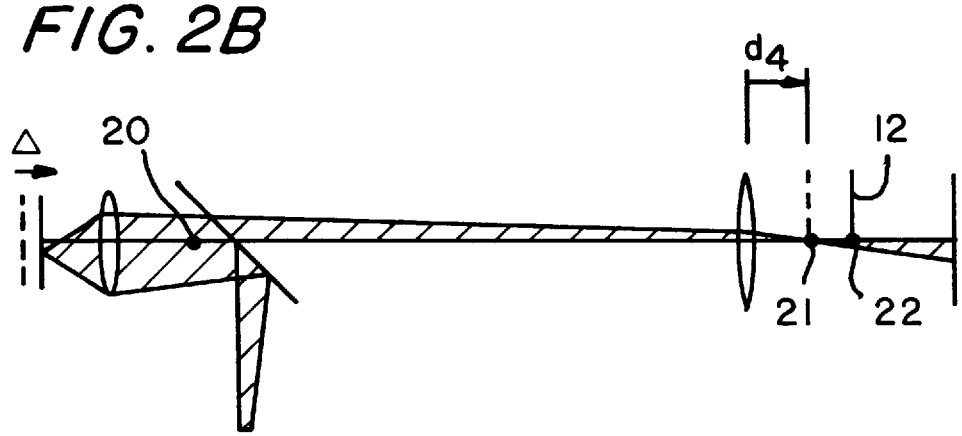
Figure 2C:
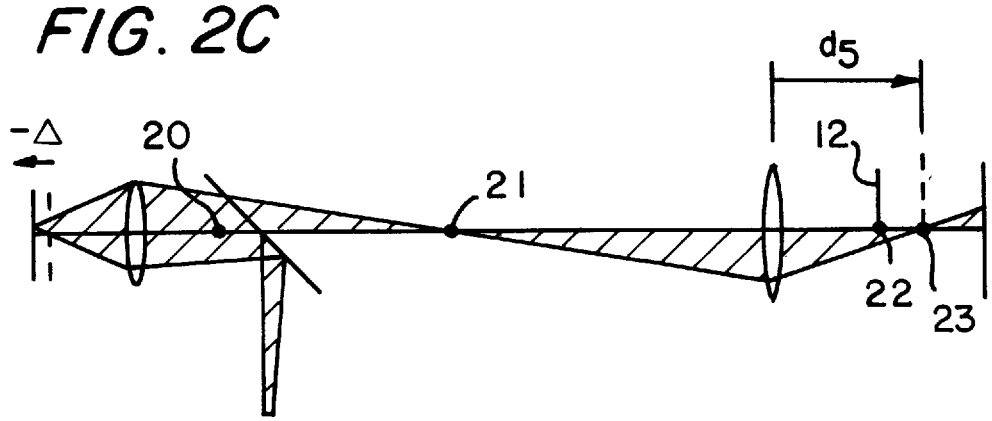

As shown in FIG. 2(B), if the object 8 is moved from the above position in the direction of the arrow (Δ) toward the objective lens 7, a defocused image is formed on one side of the photodetecting device 14 which is the opposite side of the shielding plate 12. On the other hand, as shown in FIG. 2(C), if the object 8 is moved in the direction of the arrow (-Δ) away from the objective lens 7, a defocused image is formed on the other side on the photodetecting device 14 which is the same side of the shielding plate 12. Thus, by observing the slit image through the photodetecting device 14, a properly focused condition can be detected.

If the object 8 is moved toward the objective lens 7, as shown in FIG. 2(B), the position of the first image 21 shifts toward the photodetecting device 14, and finally the first image 21 is formed behind the relay lens 11. However, no matter how close the object 8 is moved to the objective lens 7, the first image 21 is never formed behind the conjugate image point 22 of the pupil of the objective lens 7.

On the other hand, when the object 8 is moved in the direction away from the objective lens 7, as shown in FIG. 2(C), the position of the first image 21 shifts toward the objective lens 7, and that of the second image 23 also shifts toward the relay lens 11. A microscope objective lens is telecentric to an object. Therefore, if the object 8 is moved to infinity, away from the objective lens 7, the first image point 21 reaches the pupil point 20 of the objective lens 7, and accordingly that of the second image 23 reaches the conjugate image point 22 of the pupil of the objective lens 7.

Thus, if the detection-side shielding plate or blocking member 12 is placed in front of the first image 21 on the object 8 side or in back of the second image 23 on the photodetecting device 14, even the light necessary for focus detection is blocked, making it impossible to detect the properly focused condition. For this reason, the point of the first image 21 may move toward the photodetecting device 14, but never passes the conjugate image point 22 of the pupil of the objective lens 7. The point of the second image 23 may move toward the object 8, but never passes the conjugate image point 22 of the pupil of the objective lens 7.

Therefore, the ideal position for the detection-side shielding plate 12 is at the image point 22 of the pupil of the objective lens 7. In other words, when the shielding plate 12 is located at the image point 22 of the objective lens pupil, the shielding plate 12 is always between the image planes of the first image 21 and the second image 23 no matter where the object 8 is, thus preventing the plate 12 from blocking the light necessary for proper focusing.

As shown in FIG. 2(A), when $f_1$ is the focal length of the objective lens 7;

$f_3$ is the focal length of the relay lens 11;

$\beta$ is the magnification of the objective lens 7;

$d_2$ is the distance from the point of the first image 21 to the principal point of the relay lens 11 in a focused condition; and $d_3$ is the distance from the principal point of the relay lens 11 to the conjugate image point 22 of the pupil of the objective lens, the following equation (1) results:

$$d_3 = \frac{f_3(d_2 - f_1 \cdot \beta)}{d_2 - f_1 \cdot \beta - f_3} \quad (1)$$

In other words, the equation (1) provides a conjugate image point 22 of the objective lens pupil, which is an optimal position for the detection-side shielding plate 12.

As described above, the ideal position of the detection-side shielding plate 12 is a conjugate image point 22 of the objective lens pupil, obtained from the equation (1). The tolerant deviation from this ideal position is studied next.

As shown in FIG. 2(B), when the first image 21 is formed behind the relay lens 11 on the photodetecting device 14 side as a result of shifting the object 8 from the focal plane toward the objective lens 7 by $\Delta$, the following equation (2) results:

$$d_4 = \frac{f_3 \left( d_2 + \frac{\beta \cdot f_1^2}{2\Delta\beta + f_1} - f_1 \cdot \beta \right)}{d_2 + \frac{\beta \cdot f_1^2}{2\Delta\beta + f_1} - f_1 \cdot \beta - f_3} \quad (2)$$

where $d_4$ is the distance from the principal point of the relay lens 11 to the first image 21 when the first image 21 is formed behind the relay lens 11 on the photodetecting device 14 side.

As shown in FIG. 2 (C), when the object 8 is moved from the focal plane in the direction away from the objective lens 7 by $\Delta$, the following equation (3) results:

$$d_5 = \frac{f_3 \left( d_2 - \frac{\beta \cdot f_1^2}{2\Delta\beta - f_1} - f_1 \cdot \beta \right)}{d_2 - \frac{\beta \cdot f_1^2}{2\Delta\beta - f_1} - f_1 \cdot \beta - f_3} \quad (3)$$

where $d_5$ is the distance from the principal point of the relay lens 11 to the second image 23.

Therefore, to obtain a focus-detectable range of $\pm\Delta$ or more, the position of the detection-side shielding plate 12 needs to be determined at least within the range of the above $d_4$ and $d_5$ which includes the conjugate image point 22 of the objective lens pupil, whose distance from the principal point of the relay lens 11 is $d_3$.

In FIG. 2, for example, when $\beta=-100$, $f_1=2$, $f_3=50$, and $d_2=100$, the following values can be obtained from equations (1), (2), and (3):

$$d_3 = 60$$
$$d_4 = \frac{50(60000\Delta - 200)}{50000\Delta - 100}$$
$$d_5 = \frac{50(60000\Delta + 200)}{50000\Delta + 100}$$

The focus-detectable range, $\Delta$, can be determined by the maximum depth of focus of an objective lens to be used. In general, an objective lens with about 5 to 200 times magnification is used. In this case, the maximum depth of focus is of an objective lens with 5× magnification. The value of $\Delta$ may be set to the depth of focus of the objective lens with 5× magnification in order to enable detection of a properly focused condition even when the objective lens is switched from 5× magnification to another magnification. The depth of focus of the objective lens with 5× magnification is normally about ±0.03 mm, that is, $\Delta=0.03$ mm; therefore, $d_4=57.14$ mm and $d_5=62.5$ mm.

In other words, it is best to locate the detection-side shielding plate 12 at the position, 60 mm from the principal point of the relay lens 11 toward the photodetecting device.

It is preferable to position the shielding plate 12 within the range of 57.14 mm to 62.5 mm to obtain ±0.03 mm of focus-detectable range.

Figure 3:
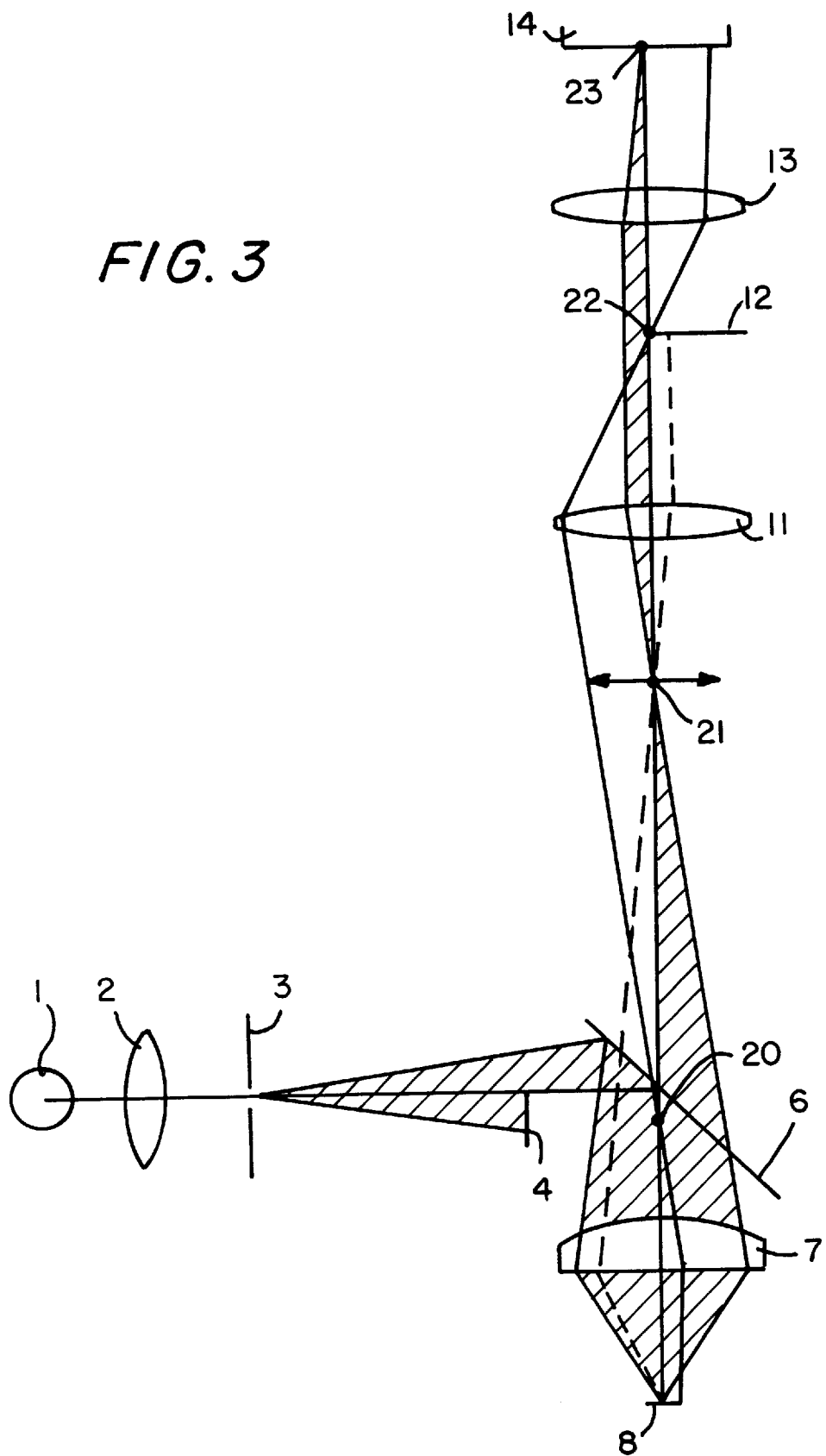
FIG. 3 is a schematic drawing showing the construction of a second embodiment of the present invention.
Figure 4A:
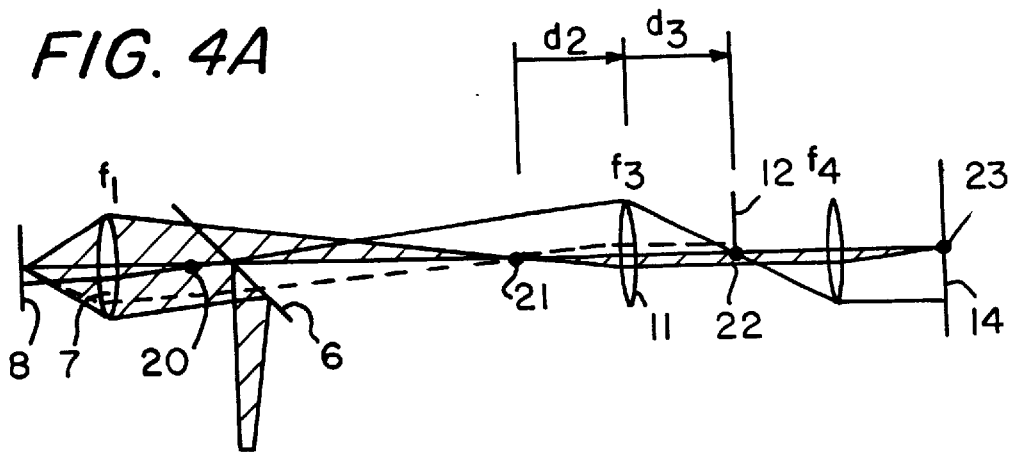
FIGS. 4(A) through 4(C), is a schematic drawing showing the optical path of the second embodiment.
Figure 4B:
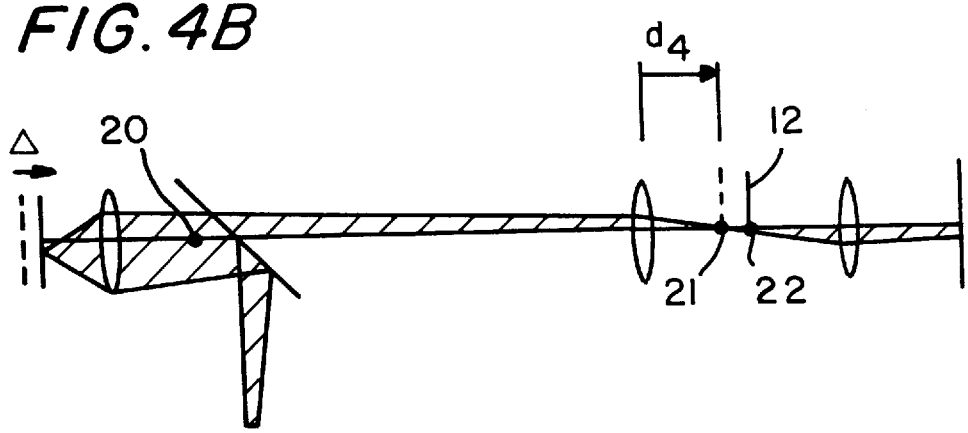
Figure 4C:
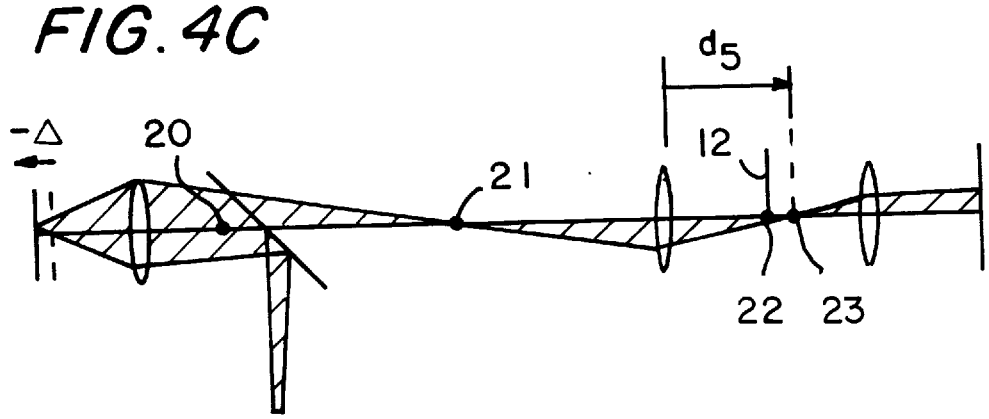

Next, FIG. 3 shows a second embodiment of the present invention, wherein a first image 21 is formed via the focal objective lens 7, and then a second image 23 is formed on the photodetecting device 14 through first and second relay lenses 11 and 13 which are both positive lenses. A conjugate image point 22 of the objective lens 7 pupil is formed between the relay lenses 11 and 13. $d_3$, $d_4$, and $d_5$ in this embodiment can be obtained by the same equations as in the first embodiment. Therefore, in FIG. 4, for example, where the operation of the embodiment of FIG. 3 is illustrated, when $\beta=-100$, $f_1=2$, $f_3=50$, $f_4=50$, $d_2=50$, and $\Delta=0.03$, the following can be obtained from the equations (1), (2), and (3):

$d_3=62.5$, $d_4=58.33$, and $d_5=66.67$.

With the values obtained in the second embodiment, it is best to locate the detection-side shielding plate 12 at the position, 62.5 mm from the principal point of the first relay lens 11 toward the photodetecting device. It is preferable to position the shielding plate 12 within the range of 58.33 mm to 66.67 mm in order to obtain ±0.03 mm of focus-detectable range.

Figure 5:
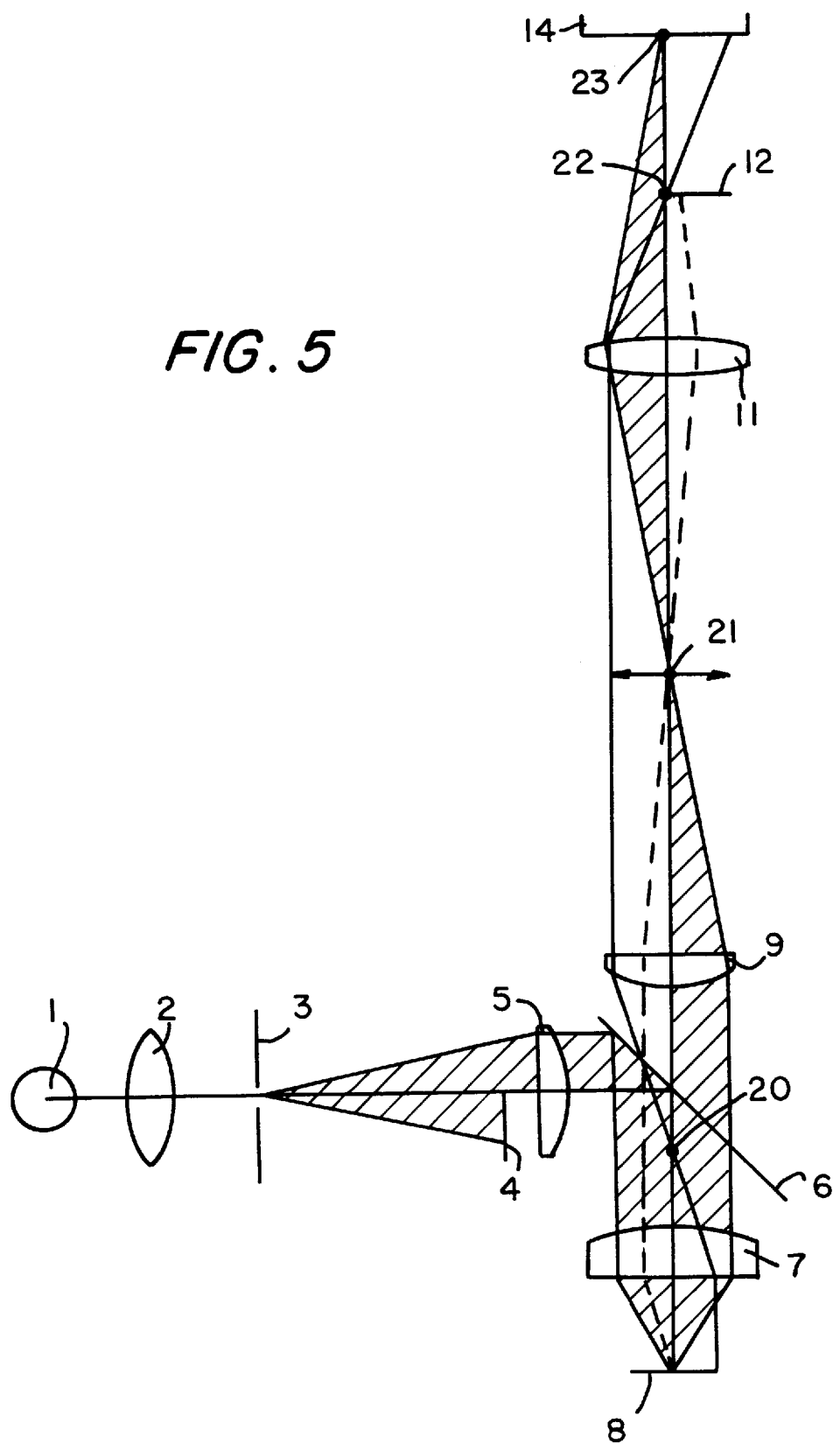
FIG. 5 is a schematic drawing showing the construction of third embodiment of the present invention.

Next, FIG. 5 shows a third embodiment, wherein the first image 21 is formed through an afocal objective lens 7' and a second objective lens 9. A second image is formed on the photodetecting device 14 through the positive relay lens 11. A conjugate image point 22 of the objective lens 7' pupil is formed between the photodetecting device 14 and the relay lens 11.

Even with this configuration, the best position for the detection-side light shielding plate 12 is at the conjugate image point 22 of the objective lens pupil. By placing the detection-side shielding plate 12 at point 22, only harmful light (diffracted light and scattered light) from the object which is shown by the dotted line can be efficiently blocked.

FIG. 6 shows the operation of the third embodiment illustrated in FIG. 5.

Figure 6A:
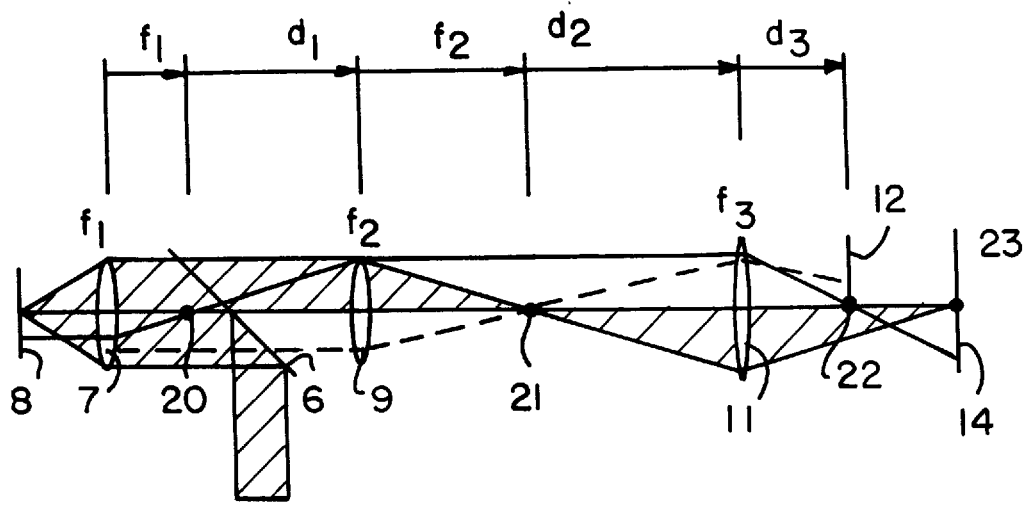
FIGS. 6(A) through 6(C), is a schematic drawing showing the optical path of the third embodiment.

As shown in FIG. 6(A), when $f_1$ is the focal length of the objective lens 7';

$f_2$ is the focal length of the second objective lens 9;

$f_3$ is the focal length of the relay lens 11;

$\beta$ is the magnification of the objective lens 7';

$d_1$ is the distance from the exit pupil point 20 of the objective lens 7' to the principal point of the second objective lens 9;

$d_2$ is the distance from the first image 21 to the principal point of the relay lens 11 in a focused condition; and $d_3$ is the distance from the principal point of the relay lens 11 to the conjugate image point 22 of the objective lens pupil, the following equation (4) results:

$$d_3 = \frac{f_3(f_2^2 - d_1 \cdot d_2 + d_2 \cdot f_2)}{f_2^2 - f_2 \cdot f_3 + d_2 \cdot f_2 + d_1 \cdot f_3 - d_1 \cdot d_2} \quad (4)$$

In other words, for a conjugate image point 22 of the objective lens pupil and for a properly focused condition, the best position for the detection-side shielding plate 12, can be given by equation (4).

Figure 6B:
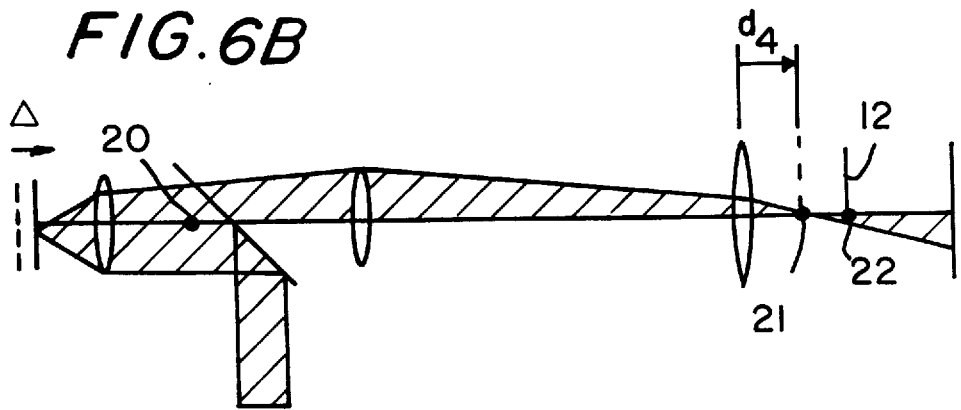

Next, as shown in FIG. 6(B), when the first image 21 is formed behind the relay lens 11 on the photodetecting device 14 side as a result of the object 8 being shifted from the focal plane toward the objective lens 7' by $\Delta$, the following equation (5) results:

$$d_4 = \frac{f_3\left[f_2^2 - d_2\left(d_1 + \frac{f_1^2}{2\Delta}\right) + d_2 \cdot f_2\right]}{f_2^2 - f_2 \cdot f_3 + d_2 \cdot f_2 - \left(d_1 + \frac{f_1^2}{2\Delta}\right)(d_2 - f_3)} \quad (5)$$

where $d_4$ is the distance from the principal point of the relay lens 11 to the first image 21 when the first image 21 is formed behind the relay lens 11 closer to the photodetecting device 14.

Figure 6C:
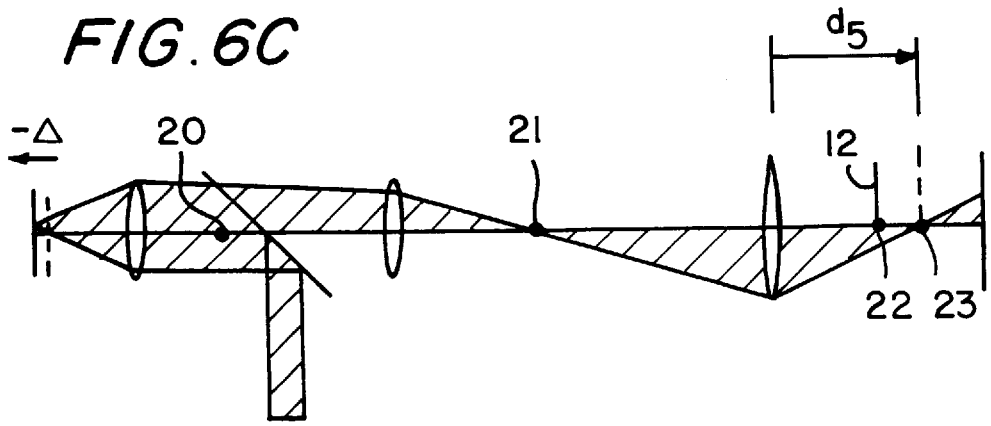

In addition, as shown in FIG. 6(C), when the object 8 shifts from the focal plane to the direction away from the objective lens 7' by $\Delta$, the following equation (6) results:

$$d_5 = \frac{f_3\left[f_2^2 + d_2\left(\frac{f_1^2}{2\Delta} - d_1\right) + d_2 \cdot f_2\right]}{f_2^2 - f_2 \cdot f_3 + d_2 \cdot f_2 + \left(\frac{f_1^2}{2\Delta} - d_1\right)(d_2 - f_3)} \quad (6)$$

where $d_5$ is the distance from the principal point of the relay lens 11 to the second image 23.

Therefore, to obtain the focus-detectable range of $\pm\Delta$ or more, the position of the detection-side shielding plate 12 needs to be determined at least within the range of the above $d_4$ and $d_5$ which includes the conjugate image point 22 of the objective lens pupil, whose distance from the principal point of the relay lens 11 is $d_3$.

In FIG. 6, for example, when $f_1=2$, $f_2=200$, $f_3=50$, $d_1=200$, $d_2=100$, and $\Delta=0.03$, the following values are obtained from the equations (4), (5), and (6):

$d_3=50$, $d_4=45.45$, and $d_5=53.85$.

With the values obtained in the third embodiment, it is best to locate the detection-side shielding plate 12 at the position, 50 mm from the relay lens 11 toward the photo-detecting device. It is preferable to position the shielding plate 12 within the range of 45.45 mm to 53.85 mm in order to obtain ±0.03 mm of focus-detectable range.

Figure 7:
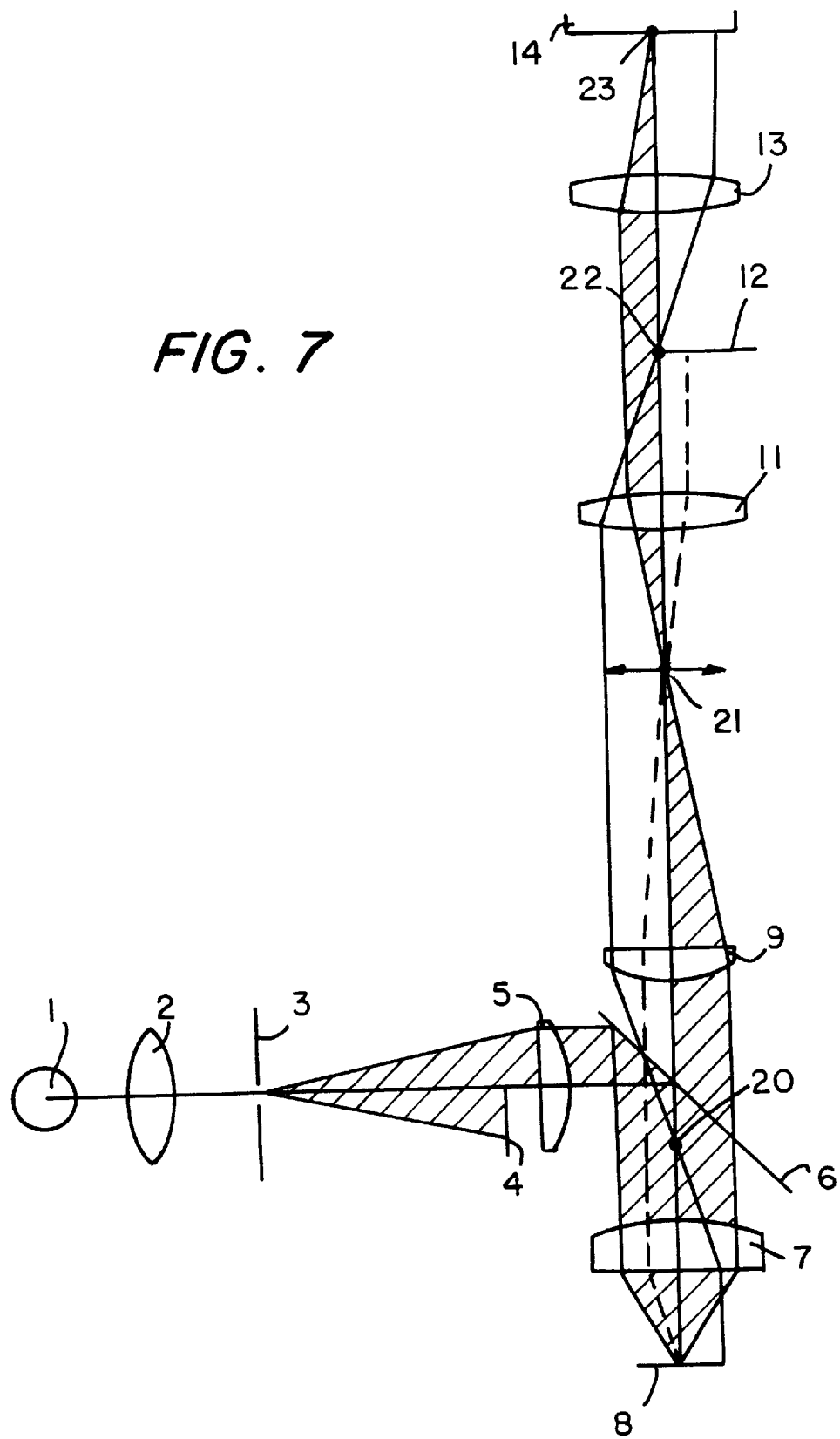
FIG. 7 is a schematic drawing showing the construction of a fourth embodiment of the present invention.

Next, FIG. 7 shows a fourth embodiment of the present invention, wherein a first image 21 is formed through an afocal objective lens 7' and a second objective lens 9, and then a second image 23 is formed on a photo-detecting device 14 through first and second positive relay lenses 11 and 13. A conjugate image point 22 of the objective lens pupil is formed between the relay lenses 11 and 13.

Figure 8A:
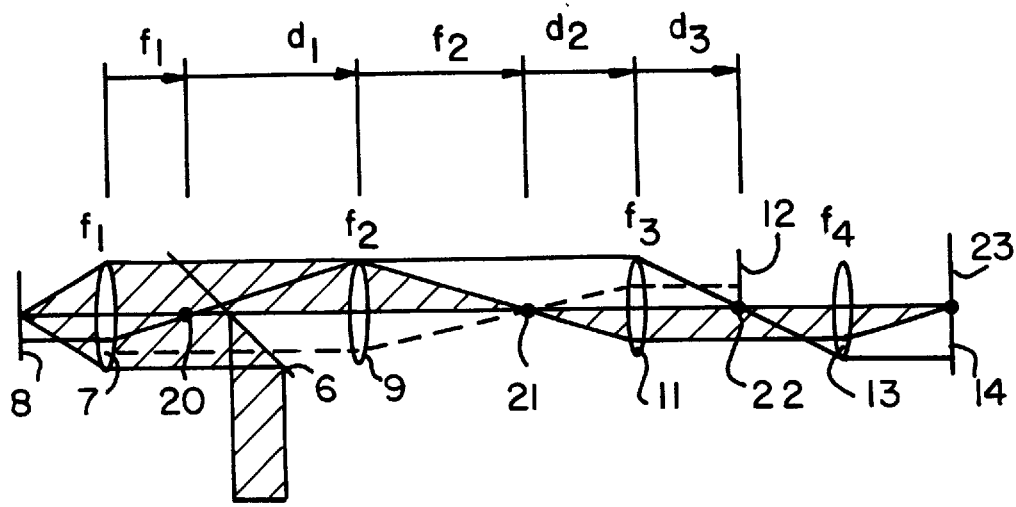
FIGS. 8(A) through 8(C), is a schematic drawing showing the optical path of the fourth embodiment.
Figure 8B:
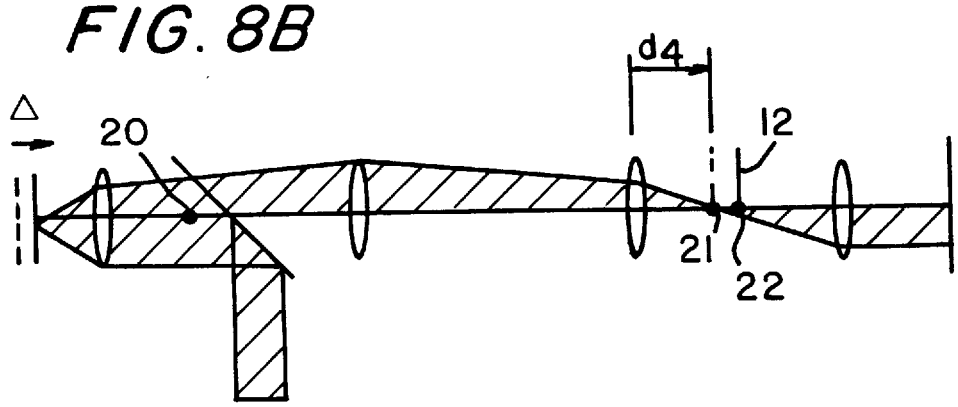
Figure 8C:
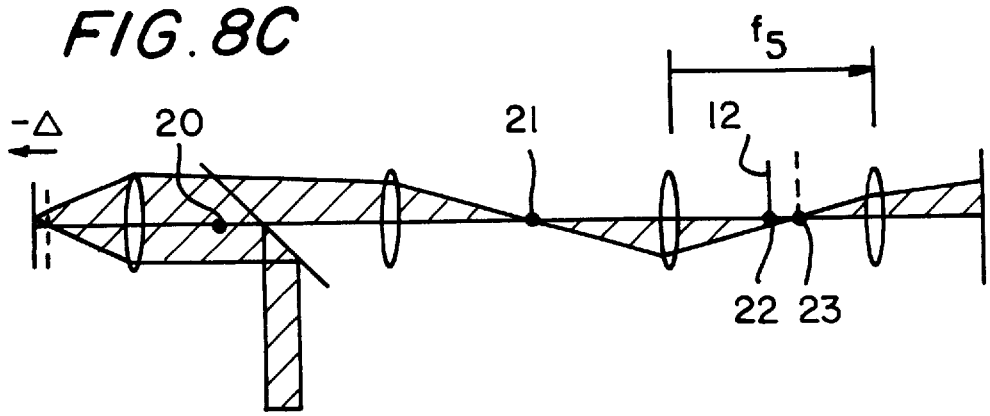
Figure 9:
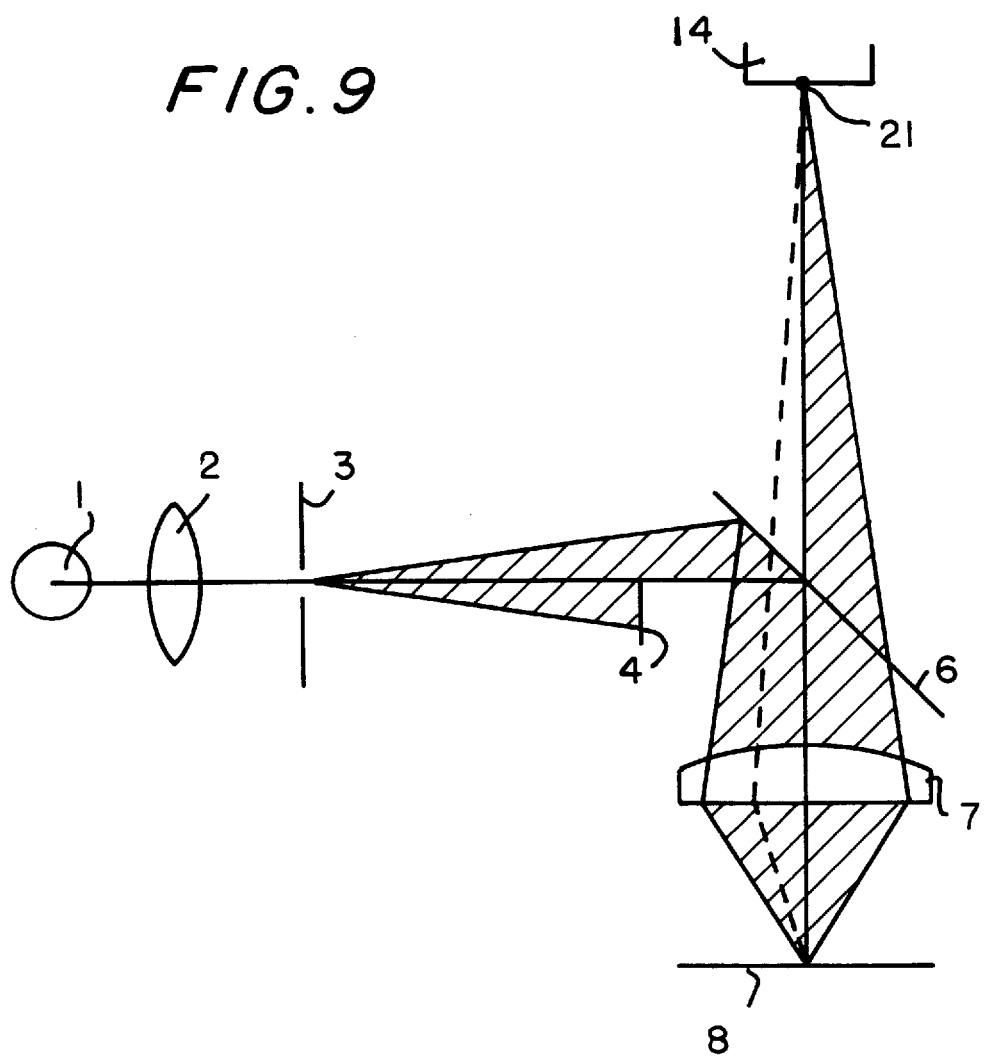
FIG. 9 is a schematic diagram showing the construction of a focus-detecting device in a conventional focal objective lens.
Figure 10:
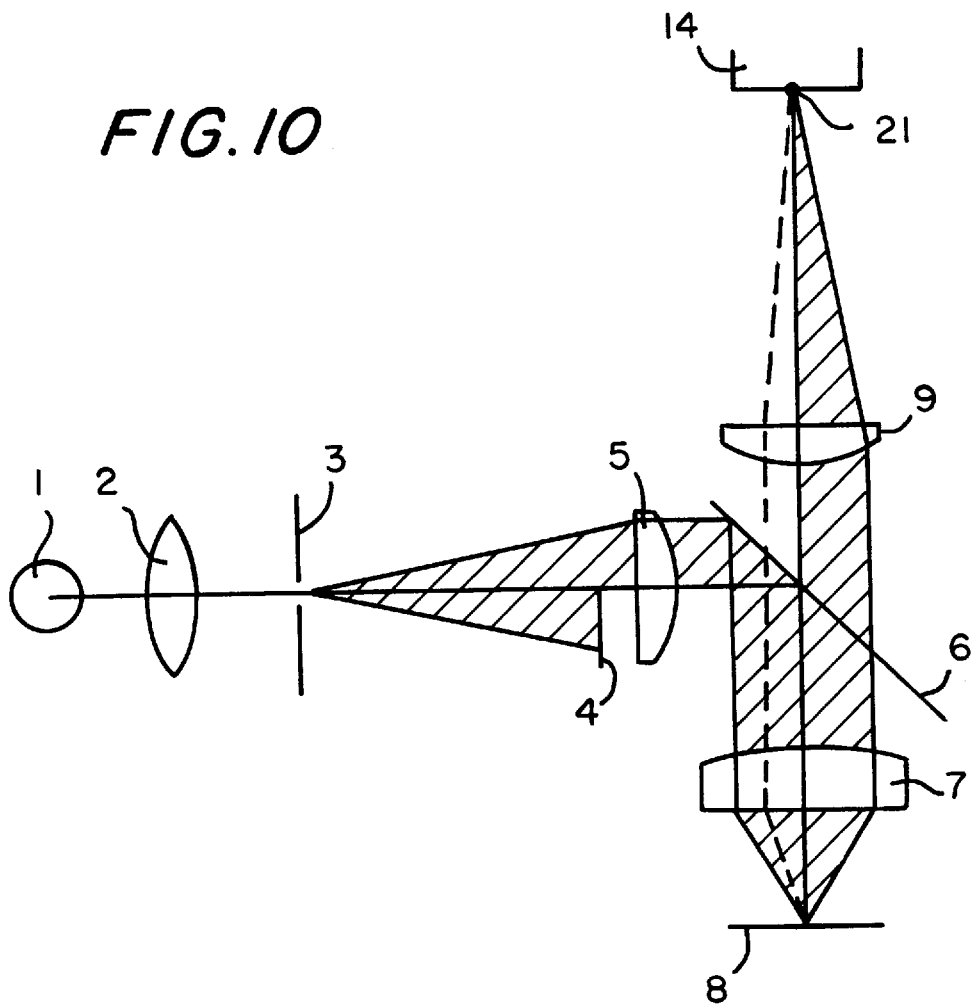
FIG. 10 is a schematic diagram showing the construction of a focus-detecting device in a conventional afocal objective lens.

$d_3$, $d_4$, and $d_5$ in this embodiment are derived by the same equations (4), (5), and (6) as in the third embodiment. Therefore, in FIG. 8, which shows the operation of the fourth embodiment, for example, when $f_1=2$, $f_2=200$, $f_3=50$, $f_4=50$, $d_1=200$, $d_2=50$, and $\Delta=0.03$, the following values are obtained from the equations (4), (5), and (6):

$d_3=50$, $d_4=45.83$, and $d_5=54.17$.

With the values obtained in the fourth embodiment, it is best to locate the detection-side shielding plate 12 at the position, 50 mm from the principal point of the first relay lens 11 toward the photodetecting device. It is preferable to position the shielding plate 12 within the range of 45.83 mm to 54.17 mm in order to obtain ±0.03 mm of focus-detectable range.

Although the pattern of the slit 3 is projected onto the object 8 through the objective lens 7 or 7' in each of the above embodiments, an image of the light source 1 itself may be projected onto the object 8 through the objective lens 7 or 7'.

Also, in each of the above embodiments, the image of the slit 3 projected onto the object 8 is partially blocked by the illumination-side shielding plate 4. However, the illumination-side shielding plate 4 may be eliminated.

In accordance with the principles of the present invention, a focus-detecting method and device can be provided in which, even when an object has a large deviation in light intensity and phase distribution, only the harmful light rays (diffracted light, scattered light) from the object are efficiently shielded and the focus-detecting range is substantially sufficient.

Various modifications will become possible for those skilled in the art after receiving the teachings of the present disclosure without departing from the scope thereof.

What is claimed is:

1. A focus-detecting method for detecting when an object is arranged in a focal plane of an object lens using a photodetection device arranged in a final imaging plane, said method comprising:

forming a light-beam pattern formed based on a light-beam on the object through said object lens;

directing said light-beam emitted from said light-beam pattern on the object and reflected from the object to said object lens;

forming a plurality of images of a light-beam pattern along an optical axis of said object lens based on said light-beam passed through said object lens and a conjugate image point of the pupil of said object lens between said object lens and said final imaging plane based on said light-beam passed through said object lens;

imaging said final light-beam pattern image toward said final imaging plane; and preventing, substantially at one of said conjugate points, a predetermined portion of said light-beam reflected from the object from reaching said final imaging plane.

2. A method, as claimed in claim 1, wherein substantially one-half of said light-beam reflected from the object is prevented from reaching said final imaging plane.

3. A focus-detecting method for detecting when an object is arranged in a focal plane of an object lens using a photodetection device arranged in a final imaging plane, said method comprising:

forming a light source image formed based on a light-beam on the object through said object lens;

directing said light-beam emitted from said light source image on the object and reflected from the object to said object lens;

forming a plurality of images of a light source along an optical axis of said object lens based on said light-beam passed through said object lens and a conjugate image point of the pupil of said object lens between said object lens and said final imaging plane based on said light-beam passed through said object lens;

imaging said final light source image toward said final imaging plane; and preventing, substantially at one of said conjugate points, a predetermined portion of said light-beam reflected from the object from reaching said final imaging plane.

4. A method, as claimed in claim 3, wherein substantially one-half of said light pattern reflected from said object is prevented from reaching said final imaging plane.

5. A focus-detecting apparatus for detecting when an object is arranged in a focal plane of an object lens using a photodetection device arranged in a final imaging plane said apparatus comprising:

a light source system for supplying a light-beam to the object and forming a light-beam pattern on the object through said object lens;

an imaging optical system for collecting said light-beam emitted from said light-beam pattern on the object and reflected from the object through said object lens, forming a plurality of images of a light-beam pattern along an optical axis and imaging said final light-beam pattern image toward said final imaging plane, said imaging optical system forming a conjugate image point of the pupil of said object lens between said object lens and said final imaging plane; and a light-blocking member arranged substantially at a conjugate image point of the pupil of said object lens for preventing a predetermined portion of said light-beam reflected from the object from reaching said final imaging plane.

6. Apparatus, as claimed in claim 5, wherein when the object is arranged within a depth of focus, said light-blocking member is disposed between a first image plane corresponding to the upper limit of said depth of focus and a second image plane corresponding to the lower limit of said depth of focus.

7. Apparatus, as claimed in claim 5, wherein said light-blocking member is arranged asymmetrically around said optical axis.

8. Apparatus, as claimed in claim 6, wherein said light-blocking member is arranged asymmetrically around said optical axis.

9. Apparatus, as claimed in claim 6, wherein a second light-blocking member is arranged in said light source system for preventing a predetermined portion of said light-beam pattern from reaching said object lens.

10. A focus-detecting apparatus for detecting when an object is arranged in a focal plane of an object lens using an photodetection device arranged in a final imaging plane, said apparatus comprising:

a light source system for supplying a light-beam to the object and forming a light source image on the object through said object lens;

an imaging optical system for collecting said light-beam emitted from said light source image on the object and reflected from the object through said object lens, forming a plurality of images of said light source image along an optical axis and imaging said final light source image toward said final imaging plane, said imaging optical system forming a conjugate image point of the pupil of said object lens between said object lens and said final imaging plane; and a light-blocking member arranged substantially at a conjugate image point of the pupil of said object lens for preventing a predetermined portion of said light-beam reflected from the object from reaching said final imaging plane.

11. Apparatus, as claimed in claim 10, wherein when the object is arranged within a depth of focus, said light-blocking member is disposed between a first image plane corresponding to the upper limit of said depth of focus and a second image plane corresponding to the lower limit of said depth of focus.

12. Apparatus, as claimed in claim 10, wherein said light-blocking member is arranged asymmetrically around said optical axis.

13. Apparatus, as claimed in claim 11, wherein said light-blocking member is arranged asymmetrically around said optical axis.

14. Apparatus, as claimed in claim 10, wherein a second light-blocking member is arranged in said light source system for preventing a predetermined portion of said light source image pattern from reaching said object lens.

* * * * *